United States Patent
Okamoto

(10) Patent No.: US 10,045,300 B2
(45) Date of Patent: Aug. 7, 2018

(54) MOBILE DEVICE, PROGRAM AND METHOD FOR CONTROLLING THE SAME

(71) Applicant: KYOCERA Corporation, Kyoto-shi, Kyoto (JP)

(72) Inventor: Katsuhiro Okamoto, Tokyo (JP)

(73) Assignee: KYOCERA CORPORATION, Kyoto (JP)

( * ) Notice: Subject to any disclaimer, the term of this patent is extended or adjusted under 35 U.S.C. 154(b) by 56 days.

(21) Appl. No.: 14/891,673

(22) PCT Filed: May 13, 2014

(86) PCT No.: PCT/JP2014/062753
§ 371 (c)(1),
(2) Date: Nov. 16, 2015

(87) PCT Pub. No.: WO2014/185431
PCT Pub. Date: Nov. 20, 2014

(65) Prior Publication Data
US 2016/0119879 A1      Apr. 28, 2016

(30) Foreign Application Priority Data

May 17, 2013 (JP) ................................ 2013-105439

(51) Int. Cl.
*H04M 1/00* (2006.01)
*H04W 52/02* (2009.01)
(Continued)

(52) U.S. Cl.
CPC ....... *H04W 52/0254* (2013.01); *H04W 4/027* (2013.01); *H04W 48/16* (2013.01);
(Continued)

(58) Field of Classification Search
None
See application file for complete search history.

(56) References Cited

U.S. PATENT DOCUMENTS 6,385,460 B1 * 5/2002 Wan .................. H04W 52/0254
455/515
7,729,327 B2 * 6/2010 Yaqub .................... H04L 47/10
370/332
(Continued)

FOREIGN PATENT DOCUMENTS

JP       2007-274074 A     10/2007
JP       2009-44309 A      2/2009
(Continued)

OTHER PUBLICATIONS

Chang et al., "Movement Detection for Power-Efficient Samrtphone WLAN Localization", 17/21/2010, MSWiM'10.*
(Continued)

*Primary Examiner* — Zhiyu Lu
(74) *Attorney, Agent, or Firm* — Hauptman Ham, LLP

(57) ABSTRACT

A mobile phone according to an embodiment includes an acceleration sensor, a communication unit, and a controller. The acceleration sensor detects acceleration value. The communication unit performs communication. When determining that a moving state changes to a stopped state based on the acceleration value detected by the acceleration sensor, the controller is configured to cause power of the communication unit to turn on.

13 Claims, 5 Drawing Sheets

(51) Int. Cl.
*H04W 4/02* (2018.01)
*H04W 48/16* (2009.01)
*H04W 84/12* (2009.01)

(52) U.S. Cl.
CPC ............. *H04W 84/12* (2013.01); *Y02D 70/00* (2018.01); *Y02D 70/12* (2018.01); *Y02D 70/122* (2018.01); *Y02D 70/124* (2018.01); *Y02D 70/126* (2018.01); *Y02D 70/142* (2018.01); *Y02D 70/144* (2018.01); *Y02D 70/146* (2018.01); *Y02D 70/164* (2018.01); *Y02D 70/166* (2018.01)

(56) References Cited

U.S. PATENT DOCUMENTS

| | | | | |
|---|---|---|---|---|
| 8,565,820 | B2* | 10/2013 | Riemer | H04M 1/72577 455/345 |
| 9,078,090 | B1* | 7/2015 | Shahmoon | H04W 4/02 |
| 9,568,323 | B2* | 2/2017 | Li | G01S 5/0263 |
| 2006/0178108 | A1* | 8/2006 | Chotoku | H04M 1/66 455/26.1 |
| 2007/0249381 | A1* | 10/2007 | Forslow | H04W 72/005 455/517 |
| 2007/0260363 | A1* | 11/2007 | Miller | G07C 5/008 701/2 |
| 2008/0112346 | A1* | 5/2008 | Tolpin | H04W 52/0229 370/311 |
| 2009/0098880 | A1* | 4/2009 | Lindquist | G01S 19/34 455/456.1 |
| 2010/0304761 | A1* | 12/2010 | Seibert | H04W 52/0254 455/456.4 |
| 2011/0124334 | A1* | 5/2011 | Brisebois | H04W 48/16 455/434 |
| 2011/0241882 | A1* | 10/2011 | Gonzales | G06Q 30/0281 340/572.1 |
| 2011/0286437 | A1* | 11/2011 | Austin | H04W 4/02 370/338 |
| 2011/0299422 | A1* | 12/2011 | Kim | H04W 48/16 370/253 |
| 2012/0122452 | A1* | 5/2012 | Brisebois | H04W 4/025 455/434 |
| 2012/0200384 | A1* | 8/2012 | Bailin | H04W 48/04 340/3.1 |
| 2012/0276932 | A1* | 11/2012 | Ferren | G02B 13/0065 455/456.6 |
| 2012/0315928 | A1* | 12/2012 | Hashimoto | G01C 21/28 455/456.6 |
| 2013/0006529 | A1* | 1/2013 | Miyamoto | G01C 21/365 701/516 |
| 2013/0090151 | A1* | 4/2013 | Ngai | H04W 52/0241 455/574 |
| 2013/0102268 | A1* | 4/2013 | Wang | G01S 19/34 455/343.2 |
| 2013/0122928 | A1* | 5/2013 | Pfluger | G01P 13/00 455/456.1 |
| 2013/0303184 | A1* | 11/2013 | Yang | G01S 5/0263 455/456.1 |
| 2013/0303194 | A1* | 11/2013 | Rowles | H04W 4/02 455/456.3 |
| 2014/0004840 | A1* | 1/2014 | Ewell, Jr. | H04W 8/22 455/418 |
| 2014/0073302 | A1* | 3/2014 | Trethewey | H04W 52/0251 455/418 |
| 2014/0171053 | A1* | 6/2014 | Stephens | H04W 52/0251 455/418 |
| 2014/0228073 | A1* | 8/2014 | Fratti | H04W 4/026 455/556.1 |
| 2014/0269363 | A1* | 9/2014 | Lee | H04W 64/006 370/252 |
| 2014/0274041 | A1* | 9/2014 | Lee | H04W 48/16 455/434 |

FOREIGN PATENT DOCUMENTS

| | | |
|---|---|---|
| JP | 2009-303234 A | 12/2009 |
| JP | 2012-191488 A | 10/2012 |

OTHER PUBLICATIONS

International Search Report dated Aug. 12, 2014, corresponding to International application No. PCT/JP2014/062753.
Office Action dated Sep. 29, 2015, corresponding to Japanese Patent Application No. 2013-105439.

* cited by examiner

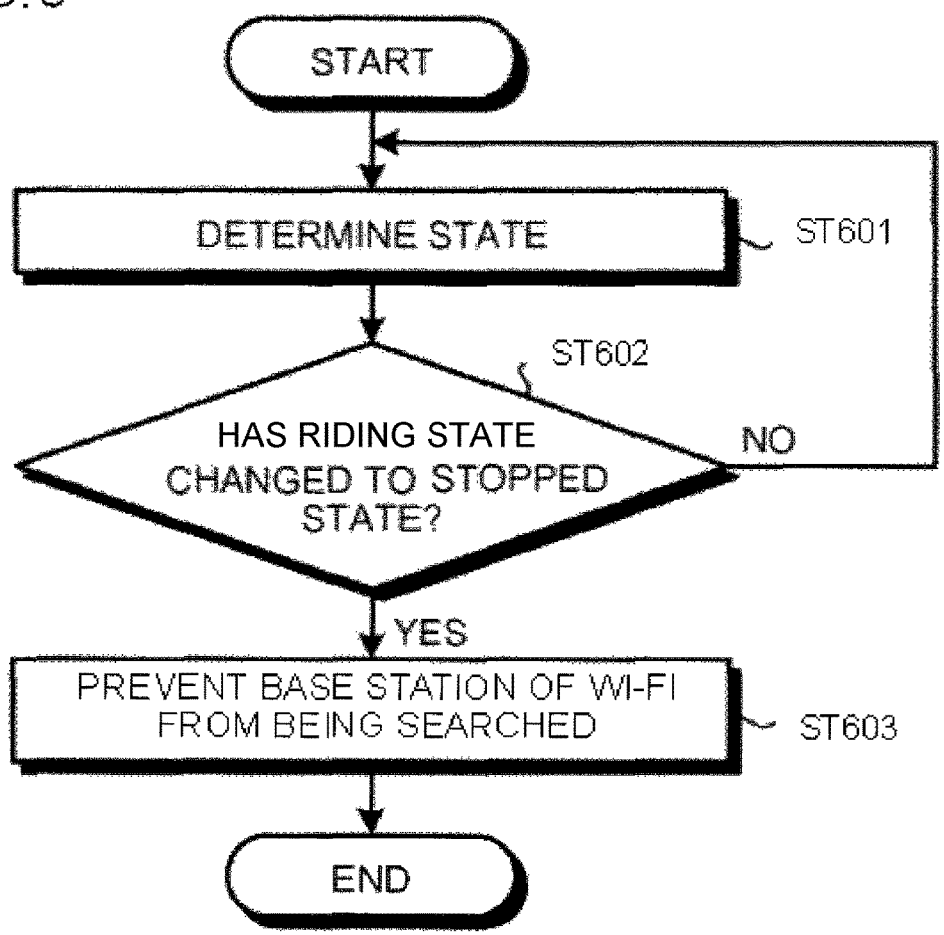

MOBILE DEVICE, PROGRAM AND METHOD FOR CONTROLLING THE SAME

CROSS-REFERENCE TO RELATED APPLICATION

This application is a National Stage of PCT international application Ser. No. PCT/JP2014/062753 filed on May 13, 2014 which designates the United States, incorporated herein by reference, and which is based upon and claims the benefit of priority from Japanese Patent Application No. 2013-105439 filed on May 17, 2013, the entire contents of which are incorporated herein by reference.

FIELD

The present disclosure relates to a mobile device, and a program and a method for controlling the mobile device.

BACKGROUND

There is a mobile device that performs communication by a plurality of communication methods (for example, refer to Japanese Patent Application Laid-open No. 2009-303234).

SUMMARY

A mobile device according to an embodiment comprises: an acceleration sensor configured to detect acceleration value; a communication unit configured to perform communication; and a controller configured to cause power of the communication unit to turn on when the controller determines that a moving state has changed to a stopped state based on the acceleration value detected by the acceleration sensor.

A mobile device according to an embodiment comprises: an acceleration sensor configured to detect acceleration value; a communication unit configured to perform communication, and a controller configured to cause power of the communication unit to turn on when the controller determines that a stopped state has changed to a moving state based on the acceleration value detected by the acceleration sensor.

A mobile device according to an embodiment comprises: an acceleration sensor configured to detect acceleration value; a communication unit configured to perform communication; and a controller configured to control power of the communication unit when the acceleration value detected by the acceleration sensor satisfies a predetermined condition.

A computer program product according to an embodiment having computer instructions, stored on a non-transitory computer readable storage medium, for enabling a computer of a mobile device comprising an acceleration sensor configured to detect acceleration and a communication module configured to perform communication executing the computer instructions to perform operations comprises: causing the mobile device to execute turning off power of the communication unit when it is determined that a stopped state has changed to a moving state based on the acceleration value detected by the acceleration sensor.

A computer program product according to an embodiment having computer instructions, stored on a non-transitory computer readable storage medium, for enabling a computer of a mobile device comprising an acceleration sensor configured to detect acceleration and a communication module configured to perform communication executing the computer instructions to perform operations comprising: causing the mobile device to execute turning on power of the communication unit when it is determined that a moving state has changed to a stopped state based on the acceleration value detected by the acceleration sensor.

A method for controlling a mobile device comprising an acceleration sensor configured to detect acceleration value and a communication unit configured to perform communication according to an embodiment, comprises turning off power of the communication unit when it is determined that a stopped state has changed to a moving state based on the acceleration value detected by the acceleration sensor.

A method for controlling a mobile device comprising an acceleration sensor configured to detect acceleration value and a communication unit configured to perform communication according to an embodiment, comprises turning on power of the communication unit when it is determined that a moving state has changed to a stopped state based on the acceleration value detected by the acceleration sensor.

BRIEF DESCRIPTION OF DRAWINGS

FIG. 6 is an explanatory flowchart of a flow of operation of a mobile phone according to an embodiment.

DESCRIPTION OF EMBODIMENTS

Embodiments of the present disclosure will be described in detail with reference to the drawings. As an example of an electronic apparatus, a mobile phone 1 will be described below.

Figure 1:
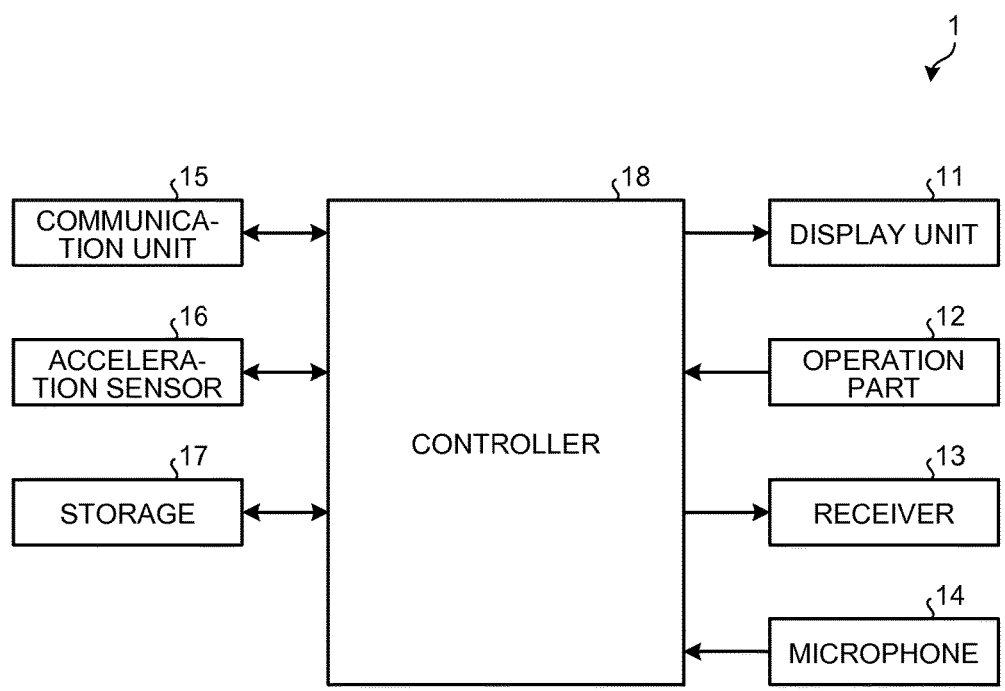
FIG. 1 is a block diagram of a configuration of a mobile phone according to an embodiment of some embodiments.

As illustrated in FIG. 1, the mobile phone 1 includes a display unit 11, an operation part 12, a receiver 13, a microphone 14, a communication unit 15, an acceleration sensor 16, a storage 17, and a controller 18.

The display unit 11 includes a display device, such as a liquid crystal display or an organic electro-luminescence panel. The display unit 11 displays, for example, a letter, an image, a symbol, or a figure.

The operation part 12 includes a plurality of buttons and are operated by a user. The operation part 12 may include a single button.

The receiver 13 converts a sound signal transmitted by the controller 18 into a sound so as to output the sound.

The communication unit 15 includes an antenna and an RF circuit unit. The communication unit 15 performs communication by a communication method corresponding to each of a plurality of wireless communication standards. The communication unit 15 enables communication by a communication standard for a cellular phone, such as 2G, 3G, and 4G, or by a wireless LAN system. The communication unit 15 enables communication by a wireless communication system that is the wireless LAN system and conforms to IEEE 802.11, such as a wireless communication system of the Wi-Fi (registered trademark). The communication unit 15 may perform communication by a wireless communication of WiMAX (registered trademark). The antennas and the RF circuit units are disposed corresponding to each of the plurality of communication methods. An embodiment in which the communication unit 15 performs the communication by the Wi-Fi, will be described.

The acceleration sensor 16 detects a direction and magnitude of acceleration acting on the mobile phone 1 so as to output a detected result to the controller 18. The acceleration sensor 16 is a 3G (three-dimension) type that detects the acceleration value in an X-axis direction, a Y-axis direction, and a Z-axis direction.

The acceleration sensor 16 includes, for example, a piezo-resistance type or an electrostatic capacitance type, but is not limited to these. For example, the acceleration sensor 16 may include, for example, a piezoelectric element (piezoelectric type), a micro electro mechanical systems (MEMS) type with a heat detecting type, a servo type that moves a movable coil and performs restoring by a feedback current, a strain gauge type that measures, with a strain gauge, a strain caused by acceleration.

The storage 17 is used, for example, for calculation processing by the controller 18, and includes, for example, a memory. The storage 17 stores one or a plurality of applications that operates inside the mobile phone 1. The storage 17 may also serve as a detachable external memory.

The controller 18 controls the entire mobile phone 1 and includes, for example, a central processing unit (CPU) or a micro-processing unit (MPU).

Processing on a result detected by the acceleration sensor 16, by the controller 18, will be described.

Figure 2:
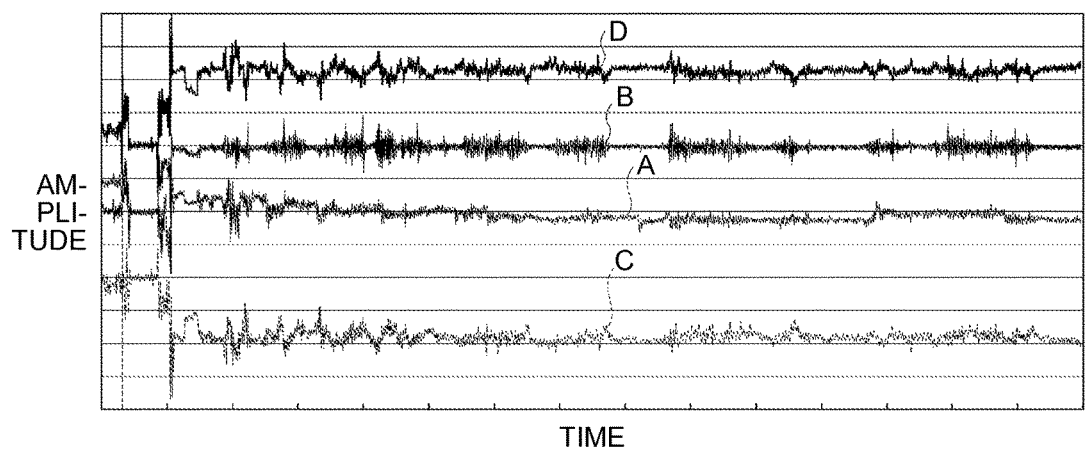
FIG. 2 is a schematic graphical representation of a result detected by an acceleration sensor according to an embodiment of some embodiments.

As illustrated in FIG. 2, as a result detected by the acceleration sensor 16, acceleration value in the X-axis direction (A in FIG. 2), acceleration value in the Y-axis direction (B in FIG. 2), acceleration value in the Z-axis direction (C in FIG. 2), and a vector value combined by the individual acceleration value (D in FIG. 2) are transmitted to the controller 18. The controller 18 performs logging to the resultant vector value. The controller 18 analyzes data to which the logging has been performed and determines a state of the mobile phone 1. The storage 17 stores the data to which the logging has been performed.

The controller 18 uses an acceleration pattern in order to determine the state of the mobile phone 1. The acceleration pattern is, for example, stored in the storage 17 in advance. The acceleration pattern is associated with each of a stopped state and a plurality of moving states. This acceleration pattern is a pattern that has been extracted by previously measuring what kind of acceleration pattern is characteristically detected by the acceleration sensor 16, for example, in a case where the mobile phone 1 is in the stopped state, in a case where the user having the mobile phone 1 has been walking so as to move, or in a case where the user has ridden a bicycle so as to move. According to an embodiment, for example, the acceleration pattern is stored in the storage 17 in advance for each of the stopped state and the plurality of moving states. The acceleration pattern is stored so as to correspond to the data of the above resultant vector value to which the logging has been performed. The controller 18 compares the data of the above resultant vector value to which the logging has been performed, with the acceleration pattern so as to determine the state of the mobile phone 1.

The controller 18 may determine, as the stopped state, a case where the acceleration value detected by the acceleration sensor 16 is less than a predetermined value, instead of an acceleration pattern in the stopped state. The controller 18 may determine, as the stopped state, a case where the data of the above resultant vector value to which the logging has been performed, does not correspond to any one of the plurality of moving states, instead of the acceleration pattern in the stopped state.

The mobile phone 1 according to an embodiment has a configuration that determines the state of the mobile phone 1 so as to search for a preferable base station. The configuration that searches for the preferable base station will be described below.

Based on the acceleration value detected by the acceleration sensor 16, when determining that the state of the mobile phone 1 has changed from the moving state to the stopped state, the controller 18 controls and causes the communication unit 15 to search for the base station (access point) corresponding to the Wi-Fi. Meanwhile, based on the acceleration value detected by the acceleration sensor 16, when determining that the state of the mobile phone 1 is in the moving state, the controller 18 controls to prevent the communication unit 15 from searching for the base station corresponding to the Wi-Fi. A control method for controlling to prevent the communication unit 15 from searching for the base station corresponding to the Wi-Fi includes a control method for controlling to prevent a search function from being performed and a method for turning off power of the communication unit 15. The controller 18 has a function that controls the power of the communication unit 15.

More specifically, the controller 18 determines whether the mobile phone 1 is in any one of the stopped state and the plurality of moving states, based on the acceleration value detected by the acceleration sensor 16.

For example, the controller 18 determines any one of the stopped state and a first moving state to a fifth moving state to be described later. The stopped state is, for example, a state where the mobile phone 1 has been placed or a state where the user having the mobile phone 1 stays. The controller 18 can determine the stopped state in a case where the acceleration value has not been detected by the acceleration sensor 16, in a case where the acceleration value detected by the acceleration sensor 16 is less than the predetermined value, or in a case where the data of the above resultant vector value to which the logging has been performed does not correspond to any one of the moving states.

The controller 18 determines any one of the first moving state to the fifth moving state to be described later so as to be able to determine a riding state on a bicycle, in a car, or in a train, or a walking state. The first moving state is a state where the user who uses the mobile phone 1 has been moving without riding in a vehicle, namely, the walking state. The second moving state is a state where the user has been moving by the car. The third moving state is a state where the user has been moving by the bicycle. The fourth moving state is a state where the user has been moving by the train. The fifth moving state is a state where the user has been moving by using other moving means.

When determining any one of the first moving state to the fifth moving state as a determined state, the controller 18 controls to prevent the communication unit 15 from searching for the base station corresponding to the Wi-Fi. Since the mobile phone 1 does not search for the base station corresponding to the Wi-Fi in the moving state, power consumption can be reduced when compared with that in a case where the search is constantly performed.

The controller 18 has a function that controls the power of the communication unit 15 when the acceleration value detected by the acceleration sensor 1 satisfies a predetermined condition. When determining that the stopped state has changed to any one of the moving states, the controller 18 controls and turns off the power of the communication unit 15. When the power of the communication unit 15 is turned off, the communication unit 15 cannot search for the base station corresponding to the Wi-Fi. Since the mobile phone 1 turns off the power of the communication unit 15 in the moving state, the power consumption can be reduced when compared with that in a state where the power is constantly on.

The controller 18 determines whether the state of the mobile phone 1 has changed. When determining that the state of the mobile phone 1 has changed from the moving state to the stopped state, the controller 18 controls and causes the communication unit 15 to search for the base station corresponding to the Wi-Fi.

The controller 18 has a function that controls the power of the communication unit 15 when the acceleration value detected by the acceleration sensor 1 satisfies a predetermined condition. When determining that any one of the moving states has changed to the stopped state, the controller 18 controls and turns on the power of the communication unit 15. When the power of the communication unit 15 is turned on, the communication unit 15 can search for the base station corresponding to the Wi-Fi. Since the mobile phone 1 turns on the power of the communication unit 15 in the stopped state, the power consumption can be reduced when compared with that in the case where the power is constantly on.

When the base station corresponding to the Wi-Fi is detected, the controller 18 attempts communication connection to the base station. When the base station detected by the search is a base station registered in the storage 17, the mobile phone 1 may be controlled so as to automatically establish the communication connection. When the base station detected by the search is a base station to which connection has been previously established, the mobile phone 1 may be controlled so as to automatically establish the communication connection. In this case, the storage 17 stores information on the base station to which the connection has been previously established.

The storage 17 stores information for identifying the base station. The information for identifying the base station includes, for example, a service set identifier (SSID). The storage 17 may store an access key that is used for establishing the communication connection to the stored base station.

The controller 18 according to an embodiment repeatedly searches for the base station until the communication connection is established. However, an embodiment is not limited to this. For example, when the base station corresponding to the Wi-Fi has not been detected during a predetermined time (for example, one minute), the controller 18 may stop searching for the base station. A control method for controlling the communication unit 15 and stopping searching for the base station corresponding to the Wi-Fi, includes a method for controlling to prevent the search function from being performed, and a method for turning off the power of the communication unit 15.

As described above, when the user in the stopped state has become in a state where data communication by the Wi-Fi is easily performed, the mobile phone 1 searches for the base station corresponding to the Wi-Fi. Therefore, since the mobile phone 1 searches for the base station corresponding to the Wi-Fi when the user is in the state where the data communication by the Wi-Fi is easily performed, convenience of the user can be improved. Since the mobile phone 1 searches for the base station corresponding to the Wi-Fi when the user is in the state where the data communication by the Wi-Fi is easily performed, the power consumption can be reduced when compared to that in the case where the search is constantly performed.

When determining that the mobile phone 1 has changed from the moving state to the stopped state, the controller 18 controls and causes the communication unit 15 to search for the base station corresponding to the Wi-Fi. The controller 18 is not limited to an embodiment. Based on any one of the plurality of moving states, the controller 18 may control the communication unit 15 in detail.

Based on the acceleration value detected by the acceleration sensor 16, when determining that the walking state has changed to the stopped state, the controller 18 may cause the base station corresponding to the Wi-Fi to be searched. The walking state is the first moving state as described above.

In an embodiment of FIG. 6, at Step ST601, the controller 18 determines a moving state, for example, a riding state, of the mobile phone 1. Based on the acceleration value detected by the acceleration sensor 16, at Step ST602, the controller 18 determines whether the riding state has changed to the stopped state. When the determination is YES, i.e., when determining that the riding state has changed to the stopped state, the controller 18 controls, at Step ST603, to prevent the base station corresponding to the Wi-Fi from being searched. When the determination is NO, the controller 18 proceeds to Step ST601. The riding state is any one of the second moving state, the third moving state, the fourth moving state, and the fifth moving state.

When the vehicle in which the user has been riding stops, possibility that the vehicle restarts or the user walks so as to move, is high. Accordingly, possibility that the user who uses the mobile phone 1 performs the data communication is low from in the second moving state to in the fifth moving state. When the riding state has changed to the stopped state, the mobile phone 1 controls to prevent the base station from being searched. Therefore, the power consumption can be reduced when compared with that in the case where the search for the base station is constantly performed in the stopped state.

The mobile phone 1 searches for the base station corresponding to the Wi-Fi when the walking state has changed to the stopped state. When the walking state has changed to the stopped state, possibility that the user has arrived at a destination is high. Since the mobile phone 1 searches for the base station when the walking state has changed to the stopped state, convenience can be improved.

The stopped state is defined as the state where the mobile phone 1 has been placed. However, an embodiment is not limited to this. For example, when satisfying a predetermined condition, the mobile phone 1 may determine the stopped state, and control to cause the communication unit 15 to search for the base station corresponding to the Wi-Fi. The predetermined condition is a nearly stopped state, namely, a state where the acceleration value detected by the acceleration sensor 16 is a small amount (less than the predetermined value).

For example, in a case where the user holds the mobile phone 1 by hand, even when the user thinks that the mobile phone 1 stays, a small amount of acceleration is sometimes detected by the acceleration sensor 16. When the controller 18 determines that the state where the acceleration value detected by the acceleration sensor 16 is a small amount is the stopped state, the mobile phone 1 determines the state where the user holds the mobile phone 1 by hand as the stopped state so as to search for the base station. The mobile phone 1 can improve the convenience of the user.

When the acceleration value detected by the acceleration sensor 16 remains less than the predetermined value during a certain period of time (for example, five seconds), namely, maintains the stopped state during the certain period of time, the mobile phone 1 may control to cause the communication unit 15 to search for the base station corresponding to the Wi-Fi.

In the case where the mobile phone 1 maintains the stopped state during the certain period of time, possibility that the user have arrived at the destination is higher than that in a case where the mobile phone 1 does not maintain the stopped state during the certain period of time. The mobile phone 1 searches for the base station corresponding to the Wi-Fi in accordance with behavior of the user. The mobile phone 1 can improve the convenience of the user.

The user may set whether the controller 18 searches for the base station corresponding to the Wi-Fi in a case of a change to each of the moving states.

In other words, the storage 17 associates, and stores, each of the first moving state to the fifth moving state with setting information on whether the base station corresponding to the Wi-Fi is searched. The controller 18 may display a setting screen illustrated in FIG. 3 on the display unit 11 so as to receive a setting whether the base station corresponding to the Wi-Fi is searched in each of the moving states.

Figure 3:
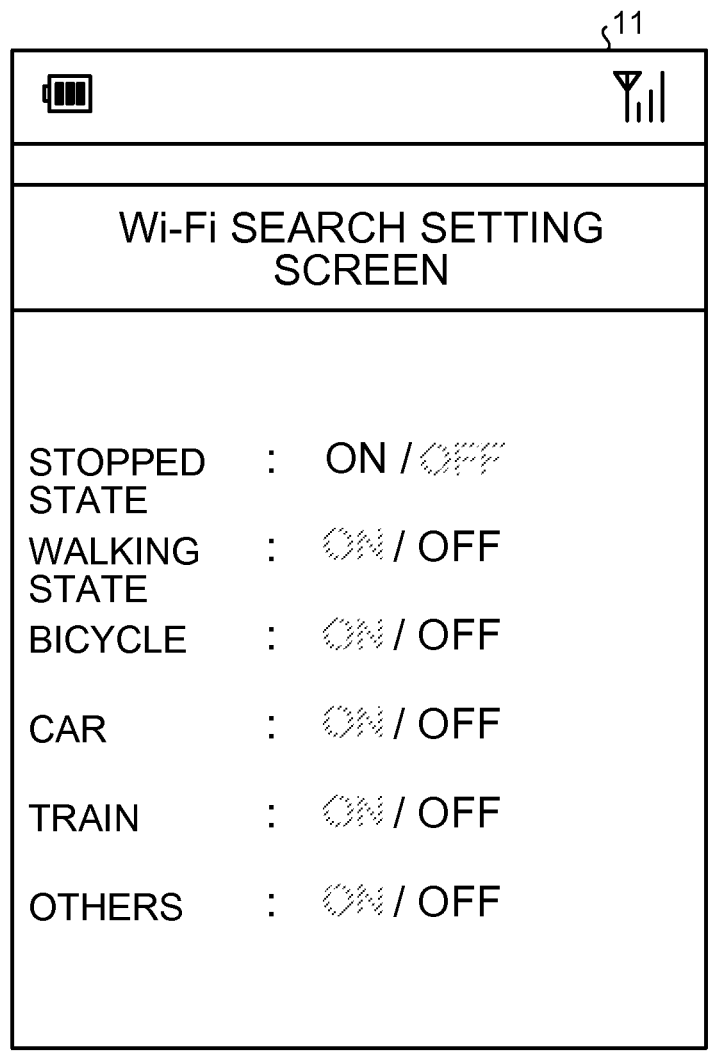
FIG. 3 is an exemplary screen for setting permission for searching for a base station in each state according to an embodiment of some embodiments.

In an example illustrated in FIG. 3, when the mobile phone 1 determines that the user is in the stopped state, the controller 18 controls to cause the communication unit 15 to search for the base station corresponding to the Wi-Fi. Meanwhile, when determining that the user is in the moving states of walking, the bicycle, the car, the train, and in other moving states, the mobile phone 1 controls to prevent the communication unit 15 from searching for the base station corresponding to the Wi-Fi.

As described above, the mobile phone 1 can search for the base station corresponding to the Wi-Fi when riding in the vehicle in accordance with a user's request.

Figure 4:
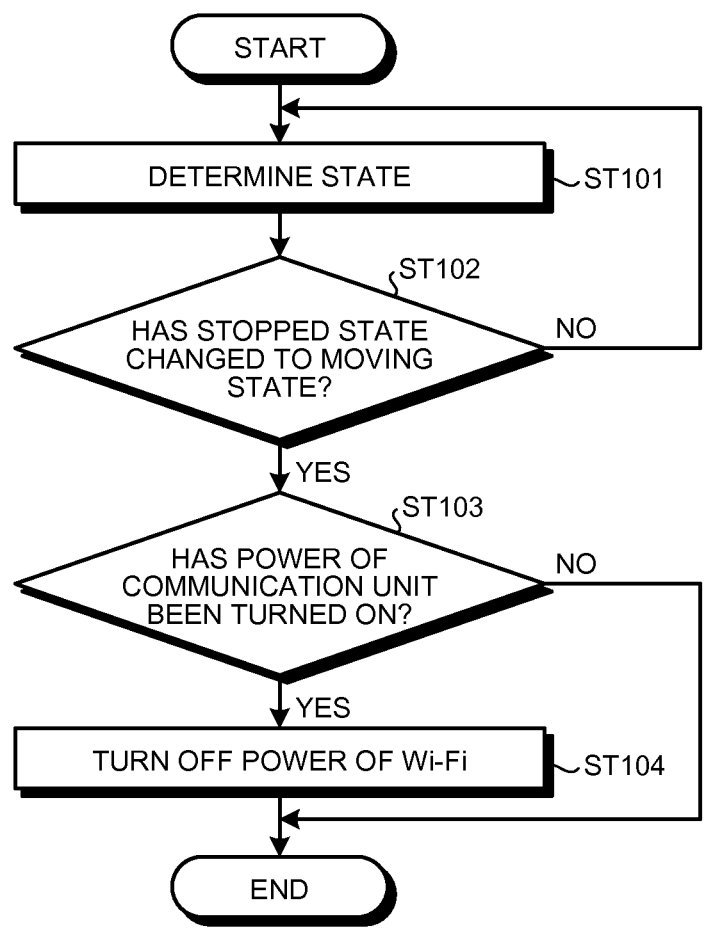
FIG. 4 is an explanatory flowchart of a flow of operation of a mobile phone according to an embodiment of some embodiments.

A flow of operation of the mobile phone 1 will be described with reference to a flowchart illustrated in FIG. 4. The following description in which determination of a state is performed in real time, will be given. However, the mobile phone 1 is not limited to an embodiment, and may determine the state at a predetermined time interval.

The mobile phone 1 starts a predetermined application by an operation of the user, starts measurement of the acceleration value in accordance with an operation of a measurement start, and completes the measurement of the acceleration value in accordance with an operation of a measurement completion. However, the mobile phone 1 is not limited to an embodiment. For example, the mobile phone 1 may start and complete the measurement of the acceleration value at start time and completion time designated by the timer, respectively. For example, the mobile phone 1 may start the measurement of the acceleration value when the power of its own device is turned on from an off state so that the start is completed. For example, the mobile phone 1 may continue the measurement of the acceleration value until the power of the own device is turned off. For example, the mobile phone 1 may continue the measurement of the acceleration value while a function for measuring the acceleration value is on.

At Step ST101, the controller 18 determines whether the state is the stopped state or the moving state, based on the result detected by the acceleration sensor 16.

At Step ST102, the controller 18 determines whether the stopped state has changed to the moving state. When the determination is YES, the controller 18 proceeds to Step ST103. When the determination is NO, the controller 18 proceeds to Step ST101.

At Step ST103, the controller 18 determines whether the power of the communication unit 15 has been turned on. When the determination is YES, the controller 18 proceeds to Step ST104. When the determination is NO, the controller 18 completes the processing of the control flow.

At Step ST104, the controller 18 turns off the power of the communication unit 15. When the processing at Step ST104 has been completed, the controller 18 completes the processing of the control flow.

According to an embodiment, based on the acceleration value detected by the acceleration sensor 16, when it is determined that the state of the mobile phone 1 has changed from the stopped state to the moving state, the mobile phone 1 controls the power of the communication unit 15 and turns off the power of the communication unit 15.

Therefore, when the user becomes in the moving state where it is difficult to perform the data communication by the Wi-Fi, the mobile phone 1 turns off the power of the communication unit 15. When the power of the communication unit 15 is turned off, the mobile phone 1 can reduce the power consumption of the mobile phone 1. When the power of the communication unit 15 is turned off, the mobile phone 1 cannot search for the base station corresponding to the Wi-Fi. Since the base station corresponding to the Wi-Fi is not searched in the moving state, the mobile phone 1 can improve the convenience of the user.

Figure 5:
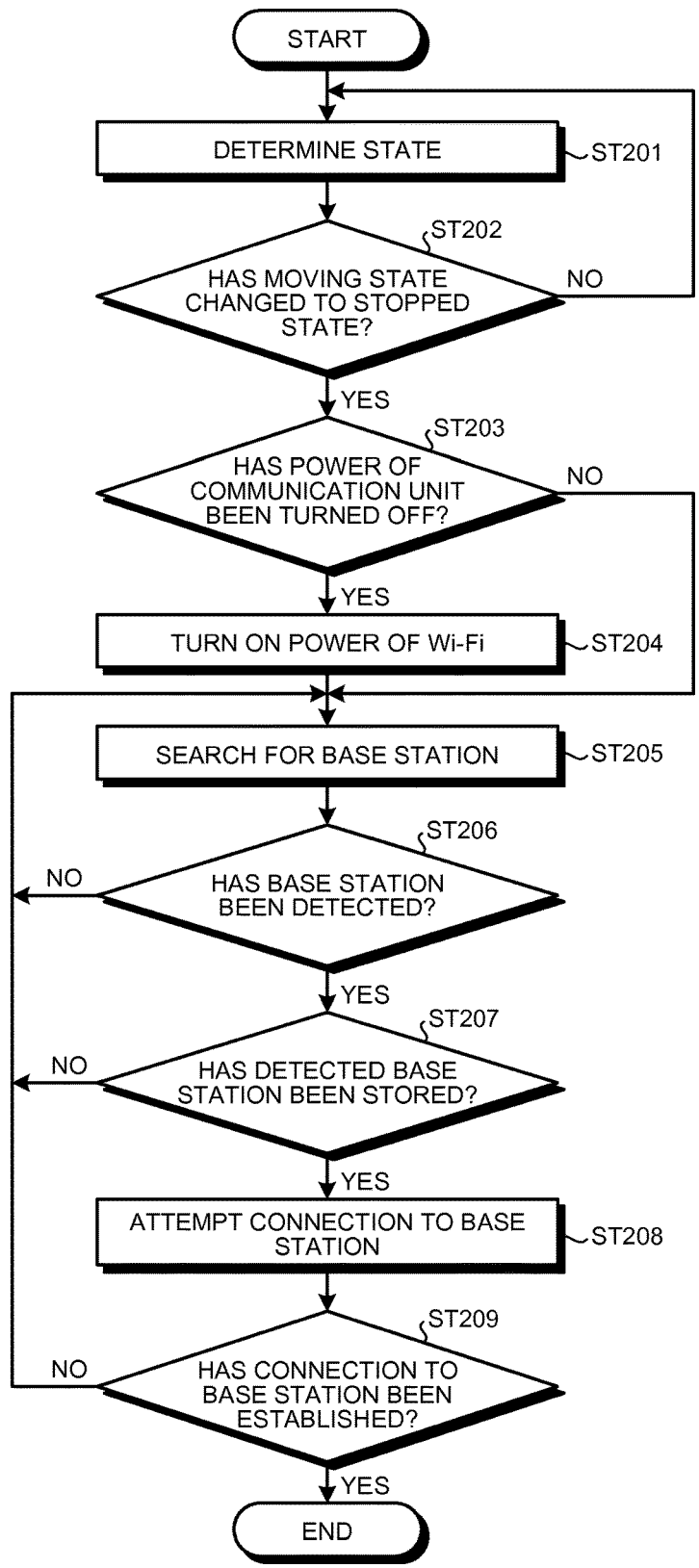
FIG. 5 is an explanatory flowchart of a flow of operation of a mobile phone according to an embodiment of some embodiments.

A flow of operation of the mobile phone 1 will be described with reference to a flowchart illustrated in FIG. 5. The following description in which determination of a state is performed in real time, will be given. However, the mobile phone 1 is not limited to an embodiment, and may determine the state at a predetermined time interval.

At Step ST201, the controller 18 determines whether the state is the stopped state or the moving state, based on the result detected by the acceleration sensor 16.

At Step ST202, the controller 18 determines whether the moving state has changed to the stopped state. When the determination is YES, the controller 18 proceeds to Step ST203. When the determination is NO, the controller 18 proceeds to Step ST201.

At Step ST203, the controller 18 determines whether the power of the communication unit 15 has been turned off. When the determination is YES, the controller 18 proceeds to Step ST204. When the determination is NO, the controller 18 proceeds to Step ST205.

At Step ST204, the controller 18 turns on the power of the communication unit 15. When the processing at Step ST204 has been completed, the controller 18 proceeds to Step ST205.

At Step ST205, the controller 18 controls and causes the communication unit 15 to search for the base station corresponding to the Wi-Fi.

At Step ST206, the controller 18 determines whether the base station has been detected. When the determination is YES, the controller 18 proceeds to Step ST207. When the determination is NO, the controller 18 proceeds to Step ST205.

At Step ST207, the controller 18 determines whether the detected base station has been stored in the storage 17. When the determination is YES, the controller 18 proceeds to Step ST208. When the determination is NO, the controller 18 proceeds to Step ST205. At Step ST207 in the control flow, it is determined whether the detected base station has been stored in the storage 17. However, the Step ST207 may be omitted and the processing may proceed to Step ST208.

At Step ST208, the controller 18 controls and causes the communication unit 15 to attempt connecting to the detected base station by the search. The controller 18 controls and causes the communication unit 15 to attempt connecting to the base station stored in the storage 17. When the processing at Step ST208 has been completed, the controller 18 proceeds to Step ST209.

At Step ST209, the controller 18 determines whether the connection to the base station to which the connection has been attempted has been established. When the determination is YES, the controller 18 completes the processing of the control flow. When the determination is NO, the controller 18 proceeds to Step ST205.

As described above, according to an embodiment, based on the acceleration value detected by the acceleration sensor 16, when it is determined that the state of the mobile phone 1 has changed from the moving state to the stopped state, the mobile phone 1 controls the power of the communication unit 15 and turns on the power of the communication unit 15. Therefore, when the user becomes in the stopped state where it is easy to perform the data communication by the Wi-Fi, the mobile phone 1 turns on the power of the communication unit 15. The mobile phone 1 can reduce the power consumption when compared with that in the case where the power of the communication unit 15 is constantly on.

According to an embodiment, based on the acceleration value detected by the acceleration sensor 16, when it is determined that the state of the mobile phone 1 has changed from the moving state to the stopped state, the mobile phone 1 controls and causes the communication unit 15 to search for the base station corresponding to the Wi-Fi. Since the base station corresponding to the Wi-Fi is searched in the stopped state, the mobile phone 1 can improve the convenience of the user.

Embodiments according to the present disclosure have been described. However, the present disclosure is not limited to the above embodiments. An effect according to the present disclosure is not limited to those described in the above embodiments.

In the above embodiments, when determining a change to the stopped state, the mobile phone 1 searches for the base station corresponding to the Wi-Fi. However, the embodiments are not limited to this. For example, the communication unit 15 corresponds to, for example, communication by the wireless LAN system. Based on the acceleration value detected by the acceleration sensor 16, when it is determined that the moving state has changed to the stopped state, the communication unit 15 may be controlled so as to search for the wireless LAN system. The wireless LAN system may include, for example, a wireless communication system conforming to IEEE 802.11, Bluetooth (registered trademark), IrDA, or near field communication (NFC).

In the above embodiments, based on the acceleration value detected by the acceleration sensor 16, it is determined whether the state of the mobile phone 1 is any one of the stopped state and the plurality of moving states. However, the embodiments are not limited to this. For example, using global positioning system (GPS), the mobile phone 1 may measure a position of the mobile phone 1 and determine whether the mobile phone 1 is in any one of the stopped state and the plurality of moving states based on an amount of displacement of the mobile phone 1 per unit time (predetermined time).

The invention claimed is:

1. A mobile device, comprising:
an acceleration sensor configured to detect acceleration value;
a transceiver configured to perform communication; and
a controller configured to determine that a walking state or a riding state of the mobile device has changed to a stopped state based on the acceleration value detected by the acceleration sensor,
wherein the controller is configured to
when the controller determines that the riding state has changed to the stopped state based on the acceleration value detected by the acceleration sensor, prevent the transceiver from searching for a base station, and
when the controller determines that the walking state has changed to the stopped state based on the acceleration value detected by the acceleration sensor, cause the transceiver to search for the base station.

2. The mobile device according to claim 1, wherein when the controller determines that the walking state has changed to the stopped state based on the acceleration value detected by the acceleration sensor, the controller is configured to
cause the power of the transceiver to turn on, and
control and cause the turned on transceiver to search for the base station.

3. The mobile device according to claim 2, wherein when the transceiver searches for a base station that has been stored, the controller is configured to attempt a connection to the searched base station.

4. A mobile device, comprising:
an acceleration sensor configured to detect acceleration value;
a transceiver configured to perform communication; and
a controller configured to cause power of a wireless LAN system of the transceiver to turn off when the controller determines that a stopped state of the mobile device has changed to a moving state based on the acceleration value detected by the acceleration sensor,
wherein
the controller is configured to determine whether the moving state is a walking state or a riding state of the mobile device in a vehicle,
when the controller determines that the moving state is the riding state and the riding state has changed to the stopped state based on the acceleration value detected by the acceleration sensor,
the controller is configured to prevent the transceiver from searching for a base station, and
when the controller determines that the moving state is the walking state and the walking state has changed to the stopped state based on the acceleration value detected by the acceleration sensor,
the controller is configured to cause the transceiver to search for the base station.

5. A computer program product, comprising a non-transitory computer readable storage medium storing thereon computer instructions for a mobile device which comprises an acceleration sensor configured to detect acceleration and a transceiver configured to perform communication, said computer instructions causing the mobile device executing the computer instructions to perform operations comprising:
turning off power of the transceiver when it is determined that a stopped state of the mobile device has changed to a moving state based on the acceleration value detected by the acceleration sensor;

determining whether the moving state is a walking state or a riding state of the mobile device in a vehicle;

when it is determined that the moving state is the riding state and the riding state has changed to the stopped state based on the acceleration value detected by the acceleration sensor, preventing the transceiver from searching for a base station; and when it is determined that the moving state is the walking state and the walking state has changed to the stopped state based on the acceleration value detected by the acceleration sensor, causing the transceiver to search for the base station.

6. A computer program product, comprising a non-transitory computer readable storage medium storing thereon computer instructions for a mobile device which comprises an acceleration sensor configured to detect acceleration and a transceiver configured to perform communication, said computer instructions causing the mobile device executing the computer instructions to perform operations comprising:

determining that a walking state or a riding state of the mobile device in a vehicle has changed to a stopped state based on the acceleration value detected by the acceleration sensor;

when it is determined that the riding state has changed to the stopped state based on the acceleration value detected by the acceleration sensor, preventing the transceiver from searching for a base station; and when it is determined that the walking state has changed to the stopped state based on the acceleration value detected by the acceleration sensor, turning on power of the transceiver, and causing the turned on transceiver to search for the base station.

7. A method for controlling a mobile device comprising an acceleration sensor configured to detect acceleration value and a transceiver configured to perform communication, the method comprising:

turning off power of the transceiver when it is determined that a stopped state of the mobile device has changed to a moving state based on the acceleration value detected by the acceleration sensor;

determining whether the moving state is a walking state or a riding state of the mobile device in a vehicle;

when it is determined that the moving state is the riding state and the riding state has changed to the stopped state based on the acceleration value detected by the acceleration sensor, preventing the transceiver from searching for a base station; and when it is determined that the moving state is the walking state and the walking state has changed to the stopped state based on the acceleration value detected by the acceleration sensor, causing the transceiver to search for the base station.

8. A method for controlling a mobile device comprising an acceleration sensor configured to detect acceleration value and a transceiver configured to perform communication, the method comprising:

determining that a walking state or a riding state of the mobile device in a vehicle has changed to a stopped state based on the acceleration value detected by the acceleration sensor;

when it is determined that the riding state has changed to the stopped state based on the acceleration value detected by the acceleration sensor, preventing the transceiver from searching for a base station; and when it is determined that the walking state has changed to the stopped state based on the acceleration value detected by the acceleration sensor, turning on power of the transceiver, and causing the turned on transceiver to search for the base station.

9. The mobile device according to claim 1, wherein the controller is configured to determine, based on the acceleration value detected by the acceleration sensor, that the stopped state is a state where the mobile device has been placed or a state where a user having said mobile device stays.

10. The mobile device according to claim 2, wherein when the stopped state continues, after the change from the riding state to the stopped state, for a certain period of time, the controller is configured to cause the transceiver to start searching for the base station.

11. The mobile device according to claim 2, wherein when the base station has not been detected for a predetermined time after the transceiver started searching for said base station, the controller is configured to cause the transceiver to turn off.

12. The mobile device according to claim 1, further comprising a display, wherein the controller is configured to cause the display to display a setting screen in which a plurality of moving states, including the walking state and the riding state, are displayed in association with a plurality of corresponding settings each indicating whether the transceiver is permitted to search for, or prevented from searching for, a base station when the mobile device is in the corresponding moving state, and the controller is configured to change the displayed settings in accordance with user input.

13. A mobile device, comprising:

a transceiver configured to perform communication, and a controller configured to cause power of a wireless LAN system of the transceiver to turn off when the controller determines that a stopped state of the mobile device has changed to a moving state based on a global positioning system (GPS) position of the mobile device, wherein the controller is configured to determine whether the moving state is a walking state or a riding state of the mobile device in a vehicle, when the controller determines that the moving state is the riding state and the riding state has changed to the stopped state, the controller is configured to prevent the transceiver from searching for a base station, and when the controller determines that the moving state is the walking state and the walking state has changed to the stopped state, the controller is configured to cause the transceiver to search for the base station.

* * * * *